United States Patent [19]
Belcher et al.

[11] Patent Number: 5,535,039
[45] Date of Patent: Jul. 9, 1996

[54] DIVERGENCE FEEDBACK IN A LINEAR FIBER OPTIC ANALOG TRANSMISSION SYSTEM AND METHOD

[75] Inventors: Donald K. Belcher, Melbourne; David M. Thomas, Malabar, both of Fla.

[73] Assignee: Harris Corporation, Melbourne, Fla.

[21] Appl. No.: 355,168

[22] Filed: Dec. 8, 1994

[51] Int. Cl.⁶ .......................... H04B 10/04; H04B 10/12
[52] U.S. Cl. .................... 359/187; 359/161; 359/188
[58] Field of Search .................................. 359/187, 161, 359/173, 188

[56] References Cited

U.S. PATENT DOCUMENTS

| | | | |
|---|---|---|---|
| 4,399,566 | 8/1983 | Roullet | 359/187 |
| 5,166,509 | 11/1992 | Curran | 359/187 |

FOREIGN PATENT DOCUMENTS

| | | | |
|---|---|---|---|
| 0507394 | 10/1992 | European Pat. Off. | 359/187 |
| 2524229 | 9/1983 | France | 359/187 |
| 0023047 | 3/1981 | Japan | 359/187 |
| 0099834 | 6/1982 | Japan | 359/187 |
| 0210740 | 12/1982 | Japan | 359/187 |
| 0151730 | 9/1983 | Japan | 359/187 |

*Primary Examiner*—Leslie Pascal
*Attorney, Agent, or Firm*—Rogers & Killeen

[57] ABSTRACT

A method and apparatus for improving the linearity of an analog signal in a fiber optic transmission system in which copies of the analog signal are provided to a remote receiver and to a feedback receiver, and in which the copy to the feedback receiver is attenuated so that the signal received at the feedback receiver is substantially similar to the signal received at the remoter receiver. An amplifier subtractively combines the signal from the feedback receiver and the analog signal to thereby provide a signal that pre-compensates for non-linearities that would be encountered by a transmission through the system. The feedback receiver and the remote receiver are substantially similar in operation so that the feedback loop substantially duplicates the environment of the transmission.

10 Claims, 1 Drawing Sheet

5,535,039

DIVERGENCE FEEDBACK IN A LINEAR FIBER OPTIC ANALOG TRANSMISSION SYSTEM AND METHOD

BACKGROUND OF THE INVENTION

The present invention relates to systems and methods for improving the linearity of an analog signal, and more particularly to a system and method in which a divergence feedback is applied to a transmission on a fiber optic cable to reduce non-linearities in the received transmission.

The use of fiber optic systems is increasing, in part because fiber optic cables are able to provide the bandwidth needed for transmission of a multiplicity of information signals. The information signals may be digital or analog, with analog signals being preferred in many applications because of the higher cost and higher power requirements of digital equipment. However, as is known, analog systems may introduce non-linearities into the received signal because of the high transmission amplification levels that are typically needed to receive a signal of sufficient strength. The non-linearities cause distortions that are manifested as crosstalk in multichannel systems that have heretofore been difficult to remove from the received signal.

Accordingly, it is an object of the present invention to provide a novel method and system for improving the linearity of an analog signal that obviates the problems of the prior art.

It is another object of the present invention to provide a novel method and system for improving the linearity of an analog signal in which a divergence feedback correction is applied to a transmitted signal.

It is yet another object of the present invention to provide a novel method and system for improving the linearity of an analog signal in a fiber optic transmission system in which an attenuator for a feedback receiver matches the attenuation experienced by the remote receiver so that the signals reaching the two receivers are substantially similar.

It is still another object of the present invention to provide a novel method and system for improving the linearity of an analog signal in a fiber optic transmission system in which substantially similar signals are provided to a feedback receiver and a remote receiver and in which the two receivers operate substantially the same way so that the signals provided from the two receivers are substantially similar.

It is a further object of the present invention to provide a novel method and system for improving the linearity of an analog signal in a fiber optic transmission system in which substantially similar signals are provided to substantially similar receivers, so that the output from one of the receivers can be compared to the transmitter input and the difference used to compensate for non-linearities in the system.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
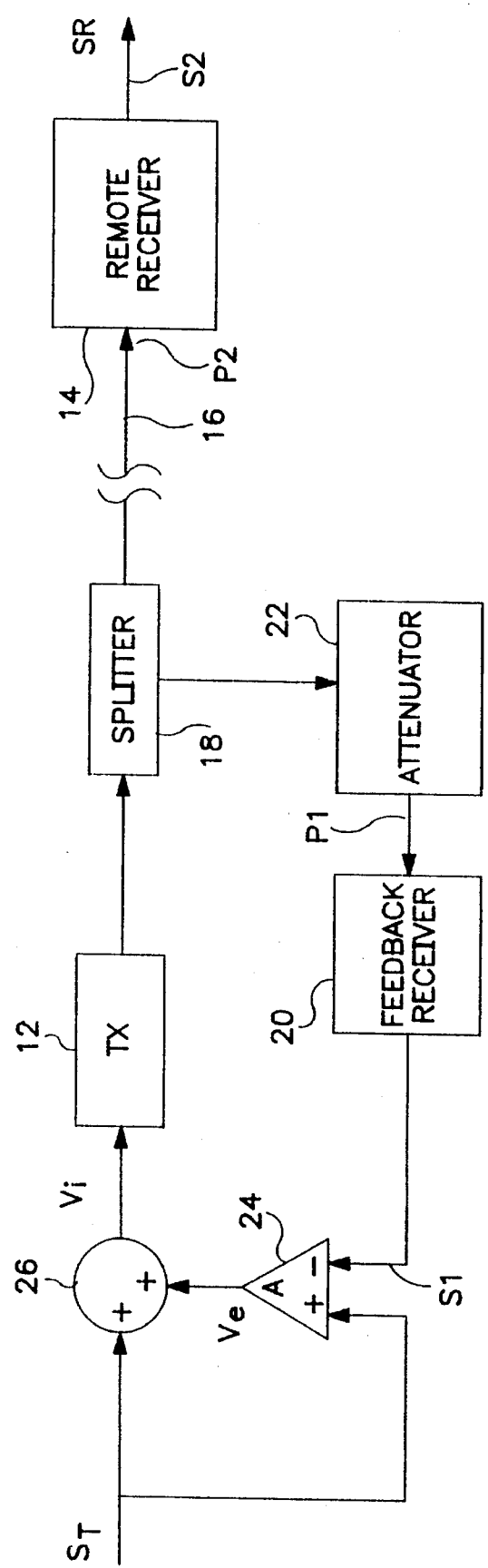
FIG. 1 is a block diagram of an embodiment of the divergence feedback apparatus of the present invention.

With reference now to FIG. 1, the present invention may find application in a fiber optic transmission system in which an analog signal is provided to an optical transmitter 12 for transmission to a remote optical receiver 14 through a fiber optic cable 16. The present invention removes, or at least reduces, non-linearities introduced by the transmitter 12, receiver 14, and/or cable 16 by providing a feedback loop that corrects the input to the transmitter 12 to compensate for non-linearities that will be encountered upon transmission. The correction is manifested by substantially duplicating the transmission environment in the feedback loop.

With further reference to FIG. 1, an embodiment of the present invention may include a splitter 18 for sending a copy of the optical transmission from the transmitter 12 to a feedback receiver 20, an optical attenuator 22 for attenuating the transmission from the transmitter 12 by an amount that is substantially the same as encountered by the signal in the cable 16 so that the signal P1 received at the feedback receiver 20 has substantially the same optical power as the signal P2 received at the remote receiver 14, an amplifier 24 of amplification A for providing the difference between an output S1 from the feedback receiver 20 and the input analog signal $S_T$, and a combiner 26 for combining the output $V_e$ from the amplifier 24 with the input analog signal $S_T$ to provide an input $V_i$ to the transmitter 12 that has been pre-compensated for the non-linearities that are expected to be encountered upon transmission. The components and connections may be conventional.

In a preferred embodiment, the feedback receiver 20 and remote receiver 14 are substantially similar in operation so that signal S1 provided to the amplifier 24 and signal S2 from the remote receiver 14 are substantially the same. To this end, the two receivers 20 and 14 may include substantially similar components, may be substantially similar in design, and may operate at substantially similar power levels. The invention does not require all of these similarities, although operation will improve as the differences between the two receivers diminish.

As used herein, the terms substantially similar and substantially the same refer to features that may be considered the same within conventional standards, but that may have some differences that do not detract from normal operation.

Operation of the invention may be more clearly understood by considering that the non-linearities (e.g., distortion products) are reduced by the gain A of amplifier 24 decibel for decibel. By way of explanation, define $d_T$ as distortion introduced by the transmitter 12 and $d_R$ as distortion introduced by the remote receiver 14 and by the feedback receiver 20, $V_i$ as the output from the combiner 26 and $V_e$ as the output from the amplifier 24, and $S_R$ as the output signal and $S_T$ as the input signal. Then, $$V_e = A[S_T - (V_i + d_T + d_R)]$$

$$V_i = S_T + AS_T - AV_i - Ad_T - Ad_R$$

Collecting terms gives, $$(1 + A)V_i = (1 + A)S_T - Ad_T - Ad_R$$

$$V_i = \frac{S_T(1+A)}{1+A} - \frac{Ad_T}{1+A} - \frac{Ad_R}{1+A}$$

$$S_R = V_i + d_T + d_R$$

and thus, $$S_R = S_T + \frac{d_T}{1+A} + \frac{d_R}{1+A}$$

As the gain A of amplifier 24 is increased, the difference between the input and output signals reduces to the difference between the remote and feedback receivers, which can be controlled. The amplifier 24 only operates on the non-linearities and thus does not have severe operating requirements. As in any feedback loop, the gain and phase relationships are desirably managed to maintain a stable loop, and to this end conventional components may be added to the above.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. An apparatus for improving the linearity of an analog signal transmitted from a transmitter and received at a first receiver in a fiber optic transmission system, the apparatus comprising:

a splitter for providing two copies of a transmission of the analog signal from the transmitter, a first copy being provided to the first receiver and a second copy being provided to a local receiver, said local receiver being substantially similar in operation to the first receiver;

an optical attenuator for attenuating said splitter second copy so that when the second copy is received at said local receiver it has an optical power substantially similar to that of said splitter first copy when it is received at the first receiver, whereby said local receiver provides an output that is substantially similar to an output from the first receiver; and an amplifier for subtractively combining said local receiver output and the analog signal to thereby provide a distortion correction signal for correcting an input to the transmitter.

2. The apparatus of claim 1 wherein said local receiver is adjacent the transmitter.

3. The apparatus of claim 1 further comprising a combiner for combining the distortion correction signal and the analog signal to provide an input to the transmitter that compensates for non-linearities in the system.

4. An apparatus for improving the linearity of an analog signal transmitted from a transmitter and received at a remote receiver in a fiber optic transmission system, the apparatus comprising:

a feedback receiver operatively connected to the transmitter;

an attenuator for attenuating a transmission of the analog signal from the transmitter to said feedback receiver so that when the transmission is received at said feedback receiver it is substantially similar to the transmission received at the remote receiver; and a comparator for determining the difference between the transmission from said feedback receiver and the analog signal to provide a correction signal that is combined with the analog signal to compensate for non-linearities in the system.

5. The apparatus of claim 4 wherein the remote receiver and said feedback receiver are substantially similar in operation.

6. The apparatus of claim 5 wherein the remote receiver and said feedback receiver have substantially similar components.

7. A method of improving the linearity of an analog signal transmitted from a transmitter and received at a first receiver in a fiber optic transmission system, the method comprising the steps of:

(a) providing a local receiver that is substantially similar in operation to the first receiver;

(b) providing two copies of a transmission of the analog signal from the transmitter, a first copy being provided to the first receiver and a second copy being provided to the local receiver;

(c) attenuating the second copy so that when the second copy is received at the local receiver it has an optical power substantially similar to that of the first copy when it is received at the first receiver; and (d) subtractively combining an output from the local receiver and the analog signal to provide a correction signal that compensates for non-linearities in the system.

8. The method of claim 7 further comprising the step of combining the correction signal with an input to the transmitter.

9. A method of improving the linearity of an analog signal transmitted from a transmitter and received at a remote receiver in a fiber optic transmission systems, the method comprising the steps of:

(a) connecting a feedback receiver to the transmitter;

(b) attenuating a transmission of the analog signal from the transmitter to the feedback receiver so that when the transmission is received at the feedback receiver it is substantially similar to the transmission received at the remote receiver; and (c) determining the difference between the transmission from said feedback receiver and the analog signal to provide a correction signal that is combined with the analog signal to compensate for non-linearities in the system.

10. The method of claim 9 further comprising the step of providing the feedback receiver with components substantially similar to components in the remote receiver so that operation of the two receivers is substantially the same.

* * * * *